US 8,331,615 B2

United States Patent
Furukawa et al.

(10) Patent No.: US 8,331,615 B2
(45) Date of Patent: Dec. 11, 2012

(54) MATCH, EXPAND, AND FILTER TECHNIQUE FOR MULTI-VIEW STEREOPSIS

(75) Inventors: Yasutaka Furukawa, Champaign, IL (US); Jean Ponce, Paris (FR)

(73) Assignee: The Board of Trustees of the University of Illinois, Urbana, IL (US)

( * ) Notice: Subject to any disclaimer, the term of this patent is extended or adjusted under 35 U.S.C. 154(b) by 1168 days.

(21) Appl. No.: 12/183,282

(22) Filed: Jul. 31, 2008

(65) Prior Publication Data

US 2009/0052796 A1 Feb. 26, 2009

Related U.S. Application Data

(60) Provisional application No. 60/953,406, filed on Aug. 1, 2007.

(51) Int. Cl.
*G06K 9/00* (2006.01)

(52) U.S. Cl. .................................................... 382/103

(58) Field of Classification Search .................. 382/154, 382/103, 181

See application file for complete search history.

(56) References Cited

U.S. PATENT DOCUMENTS 5,497,430 A * 3/1996 Sadovnik et al. ............. 382/156

OTHER PUBLICATIONS

Habbecke, et al., "Iterative Multi-View Plane Fitting", *11th Fall Workshop on Vision, Modeling, and Visualization*, (2006),9 pages.

Esteban, et al., "Silhouette and Stereo Fusion for 3D Object Modeling", *Computer Vision and Image Understanding*, vol. 96, No. 3, (2004),27 pages.

Kobbelt, et al., "A Survey of Point-Based Techniques in Computer Graphics", *Computers and Graphics*, vol. 28, No. 6, (2004),pp. 801-814.

Kutulakos, Kiriakos et al., "A Theory of Shape by Space Carving", *International Journal of Computer Vision*, vol. 38, No. 3, (2000),pp. 199-218.

Lhuillier, Maxime et al., "A Quasi-Dense Approach to Surface Reconstruction from Uncalibrated Images", *Pattern Analysis and Machine Intelligence (PAMI)*, vol. 27, No. 3, (2005),pp. 418-433.

Okutomi, Masatoshi et al., "A Multiple-Baseline Stereo", *IEEE Transactions on Pattern Analysis and Machine Intelligence*, vol. 15, No. 4, (Apr. 1993),pp. 353-363.

Paris, Sylvain et al., "A Surface Reconstruction Method Using Global Graph Cut Optimization", *Asian Conference on Computer Vision*, (Jan. 2004),36 pages.

Pons, Jean-Philippe et al., "Modelling Dynamic Scenes by Registrating Multi-View Image Sequences", *Computer Vision and Pattern Recognition*, vol. 2, (2005),6 pages.

Seitz, Steven et al., "Photorealistic Scene Reconstruction by Voxel Coloring", *Proc. Computer Vision and Pattern Recognition Conference*, (1997),pp. 1067-1073.

Furukawa, Yasutaka et al., "High-Fidelity Image-Based Modeling", *Technical Report CVR Feb. 2006*, University of Illinois at Urbana-Champaign, (2006),10 pages.

(Continued)

*Primary Examiner* — Claire X Wang (57) ABSTRACT

In accordance with one or more aspects of a match, expand, and filter technique for multi-view stereopsis, features across multiple images of an object are matched to obtain a sparse set of patches for the object. The sparse set of patches is expanded to obtain a dense set of patches for the object, and the dense set of patches is filtered to remove erroneous patches. Optionally, reconstructed patches can be converted into 3D mesh models.

34 Claims, 9 Drawing Sheets

OTHER PUBLICATIONS

Naylor, W. et al., "Free Software which You Can Download", retrieved from <http://willnaylor.com/wnlib.html> on Aug. 23, 2010, 1 page.

"Main_man—Documentation Pages for Wnlib", retrieved from <http://www.willnaylor.com/mantext/main_man.html> on Aug. 23, 2010, 3 pages.

Seitz, Steven et al., "A Comparison and Evaluation of Multi-View Stereo Reconstruction Algorithms", *Computer Vision and Pattern Recognition*, (2006),8 pages.

Strecha, Christoph et al., "Combined Depth and Outlier Estimation in Multi-View Stereo", *Computer Vision and Pattern Recognition*, (2006),pp. 2394-2401.

Tran, Son et al., "3D Surface Reconstruction Using Graph Cuts with Surface Constraints", *European Conference on Computer Vision, Part II, LNCS 3952*, (2006),pp. 219-231.

Vogiatzis, G. et al., "Multi-view Stereo via Volumetric Graph-cuts", *Computer Vision and Pattern Recognition*, (2005),8 pages.

Faugeras, Oliver et al., "Variational Principles, Surface Evolution, PDE's, Level Set Methods and the Stereo Problem", *IEEE Transactions on Image Processing*, vol. 7, No. 3, (1998),pp. 336-344.

Ferrari, Vittorio et al., "Simultaneous Object Recognition and Segmentation by Image Exploration", *European Conference on Computer Vision, Toward Category-Level Object Recognition, LNCS 4170*, copyright Springer-Verlag Berlin Heidelberg, (2006),pp. 145-169.

Furukawa, Yasutaka et al., "Carved Visual Hulls for Image-Based Modeling", *European Conference on Computer Vision*, vol. 1, (2006),28 pages.

Goesele, Michael et al., "Multi-View Stereo Revisited", *Computer Vision and Pattern Recognition*, (2006),pp. 2402-2409.

Keriven, Renaud "A Variational Framework for Shape from Contours", *Technical Report 2002-221, ENPC*, Cermics, France, (2002),15 pages.

Kushal, Akash "A Novel Approach to Modeling 3D Objects from Stereo Views and Recognizing Them in Photographs", *European Conference on Computer Vision*, vol. 2, (2006),pp. 563-574.

Otto, G. P., et al., "A "Region-Growing" Algorithm for Matching Terrain Images", *Image Vision Computing*, vol. 7, No. 2, (May 1989),pp. 83-94.

Hoppe, Hugues et al., "Mesh Optimization", *SIGGRAPH '93*, (1993),pp. 19-25.

Hornung, Alexander "Hierarchical Volumetric Multi-view Stereo Reconstruction of Manifold Surfaces based on Dual Graph Embedding", *Computer Vision and Pattern Recognition*, (2006),8 pages.

Kazhdan, Michael et al., "Poisson Surface Reconstruction", *Eurographics Symposium on Geometry Processing*, (2006), 10 pages.

Vogiatzis, George et al., "Multi-view Stereo via Volumetric Graph-cuts and Occlusion Robust Photo-Consistency", *IEEE Transactions on Pattern Analysis and Machine Intelligence*, vol. 29, No. 12, (Dec. 2007),pp. 2241-2246.

Baumgart, Bruce G., "Geometric Modeling for Computer Vision", *Stanford Artificial Intelligence Laboratory, Memo AIM-249; Computer Science Department; School of Humanities and Sciences; PhD thesis;* Stanford University, (Oct. 1974), 150 pages.

Besl, Paul J., et al., "A Method for Registration of 3-D Shapes", *IEEE Transactions on Pattern Analysis and Machine Intelligence*, vol. 14, No. 2, (Feb. 1992), 18 pages.

Curless, Brian et al., "A Volumetric Method for Building Complex Models from Range Images", In *SIGGRAPH, ACM Press*, (Aug 4-9, 1996), 10 pages.

Delingette, H et al., "Shape Representation and Image Segmentation Using Deformable Surfaces", *Carnegie Mellon University; Research Showcase; School of Computer Science; Robotics Institute; Paper 391*, (Jan. 1, 1992), 15 pages.

Huber, Daniel F., et al., "3D Modeling Using a Statistical Sensor Model and Stochastic Search", *Carnegie Mellon University; Research Showcase; School of Computer Science; Robotics Institute; Paper 417*, (Jan. 1, 2003), 9 pages.

Kolmogorov, Vladimir et al., "Multi-camera Scene Reconstruction via Graph Cuts", *Computer Science Department; Cornell University; In ECCV*, vol. 3, (2002), 16 pages.

Lachaud, Jacques-Olivier et al., "Deformable Meshes with Automated Topology Changes for Coarse-to-fine Three-dimensional Surface Extraction", *Medical Image Analysis*, vol. 3, No. 2, (1998), 21 pages.

Lavest, Jean-Marc et al., "Do We Really Need an Accurate Calibration Pattern to Achieve a Reliable Camera Calibration?", *Lecture Notes in Computer Science;* vol. 1406, (1998), 17 pages.

Lazebnik, Svetlana "Projective Visual Hulls", *Beckman CVR Technical Report Jan. 2001; Department of Computer Science; University of Illinois at Urbana-Champaign; MS Thesis*, (Jan. 2002), 220 pages.

Levoy, Marc et al., "The Digital Michelangelo Project: 3D Scanning of Large Statues", In *SIGGRAPH*, (2000), 48 pages.

Matusik, Wojciech et al., "Image-Based 3D Photography Using Opacity Hulls", *Biggraph 2002 CSc83020 Presentation in SIGGRAPH* (2002), 4 pages.

Mikolajczyk, Krystian et al., "An Affine Invariant Interest Point Detector", *INRIA Rhone-Alpes & GRAVIR-CNRS: In ECCV*, (2002), 15 pages.

Rothganger, Fred et al., "3D Object Modeling and Recognition Using Local Affine-Invariant Image Descriptors and Multi-View Spatial Constraints", *Department of Computer Science and Beckman Institute; University of Illinois at Urbana-Champaign; IJCV*, (2005), 47 pages.

Sinha, Sudipta N., et al., "Multi-view Reconstruction using Photoconsistency and Exact Silhouette Constrainsts: A Maximum-Flow Formulation", *Department of Computer Science; University of North Carolina at Chapel Hill; In ICCV*, (2005), 8 pages.

Sinha, Sudipta N., et al., "Visual-Hull Reconstruction from Uncalibrated and Unsynchronized Video Streams", *Department of Computer Science; University of North Carolina at Chapel Hill; In International Symposium on 3D Data Processing, Visualization & Transmission*, (2004), 8 pages.

Soatto, Stefano et al., "Tales of Shape and Radiance in Multi-view Stereo", *Computer Science Department; University of California; Electrical and Computer Engineering; Georgia Institute of Technology; In ICCV*, (2003), 8 pages.

Uffenkamp, V "State of the Art of High Precision Industrial Photogrammetry ", *Insitut fur Photogrammetrie und Bildverarbeitung; Technische Universitat Braunschweig; Germany; In Third International Workshop on Accelerator/Alignment*, (1993), 14 pages.

\* cited by examiner

MATCH, EXPAND, AND FILTER TECHNIQUE FOR MULTI-VIEW STEREOPSIS

RELATED APPLICATIONS

This application claims the benefit under 35 U.S.C. §119(e) of U.S. Provisional Application No. 60/953,406 filed Aug. 1, 2007, which is hereby incorporated by reference herein.

GOVERNMENT LICENSE RIGHTS

This invention was made with Government support under Contract Number IIS-0535152 awarded by the National Science Foundation. The Government has certain rights in the invention.

BACKGROUND

As computers have become more powerful, processing-intensive applications such as 3-dimensional (3D) image modeling have become increasingly commonplace. One type of such 3D image modeling is multi-view stereopsis, which reconstructs a 3D model of an object from multiple images. However, problems exist with multi-view stereopsis techniques because such techniques typically suffer from poor accuracy and/or initialization processes that may not be feasible for various types of images.

SUMMARY

This Summary is provided to introduce subject matter that is further described below in the Detailed Description and Drawings. Accordingly, the Summary should not be considered to describe essential features nor used to limit the scope of the claimed subject matter.

A match, expand, and filter technique for multi-view stereopsis is discussed herein. In accordance with one or more aspects, features across multiple images of an object are matched to obtain a sparse set of patches for the object. The sparse set of patches is expanded to obtain a dense set of patches for the object, and the dense set of patches is filtered to remove erroneous patches. Optionally, reconstructed patches can be converted into 3D mesh models.

BRIEF DESCRIPTION OF THE DRAWINGS

Non-limiting and non-exhaustive embodiments are described with reference to the following figures, wherein like reference numerals refer to like parts throughout the various views unless otherwise specified.

DETAILED DESCRIPTION

A match, expand, and filter technique for multi-view stereopsis is discussed herein. Generally, a model of an object is generated based on multiple images of the object. Features are matched across the multiple images to obtain a sparse set of patches. The sparse set of patches is then expanded to include additional patches, the expanded set being referred to as a dense set of patches. The dense sense of patches is then filtered to remove erroneous patches from the dense set. This expansion and filtration is repeated multiple times, resulting in a set of patches that is a model of the object. Optionally, the reconstructed patches can be converted into 3D mesh models.

Figure 1:
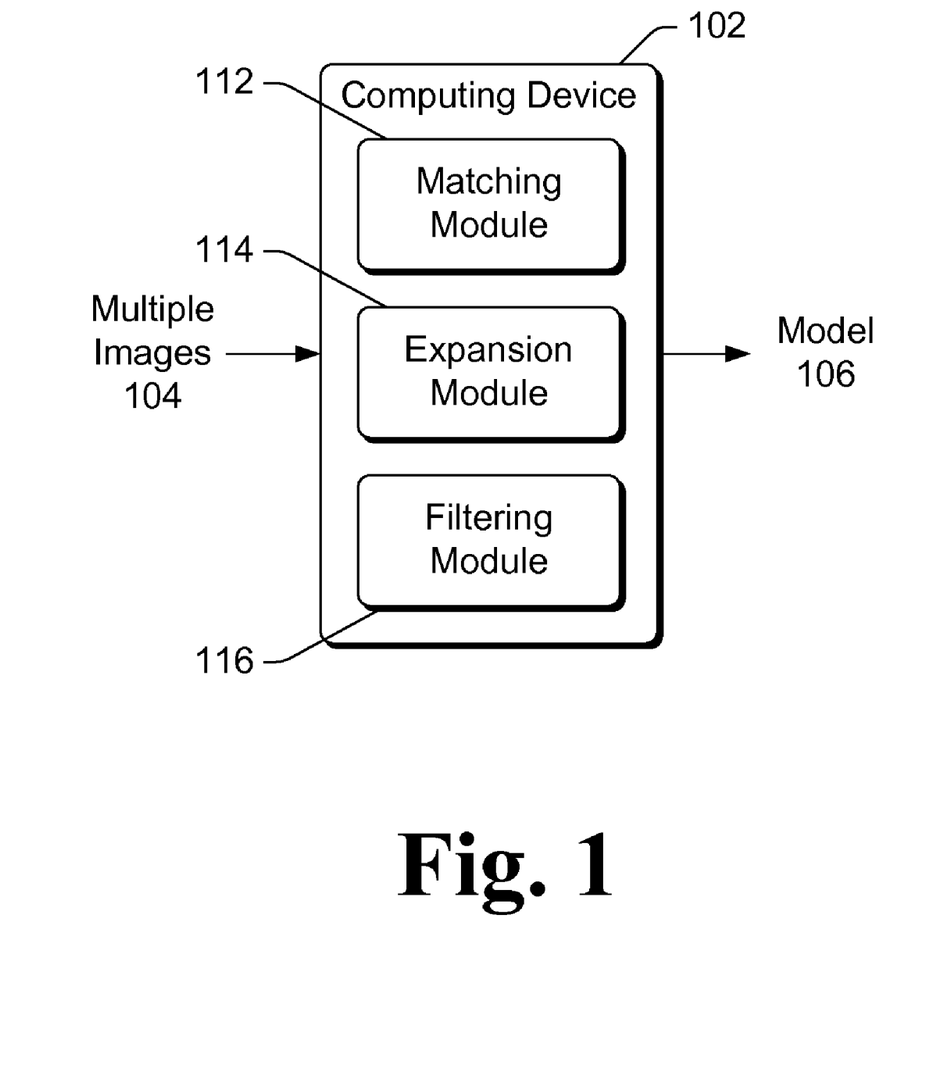
FIG. 1 illustrates an example computing device employing the match, expand, and filter technique for multi-view stereopsis in accordance with one or more embodiments.

FIG. 1 illustrates an example computing device 102 employing the match, expand, and filter technique for multi-view stereopsis in accordance with one or more embodiments. Computing device 102 can be a variety of different devices capable of processing images. By way of example, computing device 102 can be a desktop computer, a laptop computer, a portable or handheld computer, a server computer, an automotive computer, a cellular or other wireless phone, a set-top box, a game console, a portable music player, a digital or video camera, and so forth.

Computing device 102 obtains multiple images 104 and generates, based on images 104, a model 106 of an object in images 104. Images 104 can be obtained from a variety of different sources, such as a local fixed storage device, a local removable storage device, a remote server or other remote device, one or more image capture devices, another computing device 102, and so forth. Additionally, as discussed in more detail below, model 106 can take a variety of different forms, such as a 3-dimensional (3D) model, surface meshes for image-based modeling applications, and so forth.

Computing device 102 includes a matching module 112, an expansion module 114, and a filtering module 116. Matching module 112 analyzes images 104 and matches features across multiple images to create a sparse set of patches. Expansion module 114 uses the set of patches and spreads the matches in those patches to nearby pixels to obtain a dense set of patches. The set of patches used by expansion module 114 can be the sparse set of patches created by matching module 112, or a set of patches output by filtering module 116. Filtering module 116 uses visibility constraints to eliminate incorrect matches in the dense set of patches generated by expansion module 114. These incorrect matches are patches lying in front of or behind the object surface. These modules 112-116 and their operation are discussed in more detail below.

Figure 2:
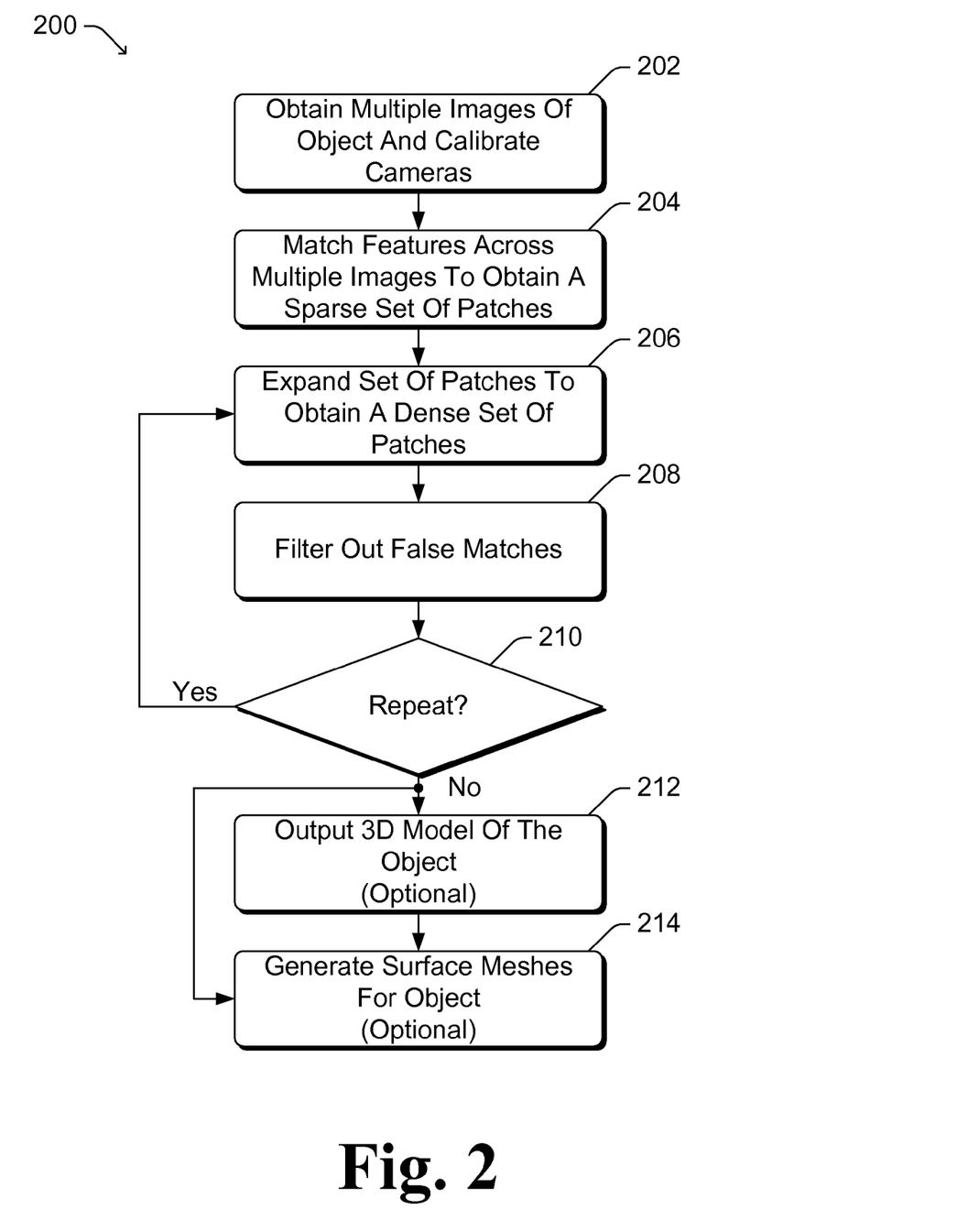
FIG. 2 is a flowchart illustrating an example process for the match, expand, and filter technique for multi-view stereopsis in accordance with one or more embodiments.

FIG. 2 is a flowchart illustrating an example process 200 for the match, expand, and filter technique for multi-view stereopsis in accordance with one or more embodiments. Process 200 is carried out by a device, such as computing device 102 of FIG. 1, and can be implemented in software, firmware, hardware, or combinations thereof. Process 200 is an example process for the match, expand, and filter technique for multi-view stereopsis; additional discussions of the match, expand, and filter technique for multi-view stereopsis are included herein with reference to different figures.

In process 200, multiple images of an object are obtained and the cameras are calibrated (act 202). Each image typically showing the object from a different viewing angle than the other images. The images can be obtained in a variety of different manners, such as by requesting or retrieving the images from one or more devices (e.g., one or more computing devices, one or more storage devices, etc.), having the images sent from one or more devices, and so forth. The calibration of the cameras refers to recording image capture parameters, such as the location of the camera (or other image capture device) when the image was captured, and the direction the camera (or other image capture device) was facing when the image was captured. These parameters are used as part of the match, expand, and filter technique for multi-view stereopsis, as discussed in more detail below.

Features across multiple images are matched to obtain a sparse set of patches (act 204). In one or more embodiments each patch is a rectangle, although other shapes can alternatively be used (e.g., circles, triangles, pentagons, hexagons, and so forth). The features can be found using a variety of different techniques. In one or more embodiments, Harris and Difference-of-Gaussian (DoG) operators are used to detect corner and blob features in each image, although alternatively other feature detection techniques can be used. After these features are found in each image, they are matched across the multiple images. When the same feature is found in multiple images, the patches that include that feature are added to a sparse set of patches.

The sparse set of patches are then expanded to obtain a dense set of patches (act 206). As part of the expansion, starting from the sparse set, new patches are repeatedly added to the neighboring empty spaces of existing patches, resulting in a denser set of patches. Various rules or conditions are used to determine which neighboring patches are added to the sparse set of patches as discussed in more detail below.

The dense set of patches is then filtered to remove false matches (act 208). These false matches are erroneous patches that should not be included as part of the set of patches for the object. In one or more embodiments, one or more filters are applied to remove patches from the dense set of patches that lie outside the surface of the object as well as to remove patches from the dense set of patches that lie inside the surface of the object. After the filtering, a filtered dense set of patches remains.

In one or more embodiments, as part of process 200 a grid of cells is overlaid on each of the images. During the expansion and filtering processes of acts 206 and 208, an attempt is made to create a dense set of patches that includes at least one patch corresponding to each cell of each of the images.

A check is then made as to whether the expansion of act 206 and the filtering of act 208 are to be repeated (act 210). In one or more embodiments, acts 206 and 208 are repeated two additional times, so that the expansion and filtering in acts 206 and 208 is each performed three times. In alternate embodiments, acts 206 and 208 can each be performed one time, two times, or four or more times. In other embodiments, rather than repeating acts 206 and 208 a particular number of times, acts 206 and 208 can be repeated until some other condition is satisfied (e.g., until a patch is reconstructed for each cell in one or more images, until at least a threshold number of patches are in the filtered dense set of patches, and so forth).

If the expansion and filtering are to be repeated, then process 200 returns to act 206 to perform the expansion. However, the expansion now is performed on the filtered dense set of patches that result from the filtering of act 208.

If the expansion and filtering are not to be repeated, then a model of the object in the images is output. This model can take a variety of different forms. In one or more embodiments, a 3D model of the object is output (act 212). The filtered dense set of patches generated in act 208 forms an oriented point or surfel model of the object. Alternatively, or in addition to, surface meshes for the object can be generated (act 214) and output as a model of the object.

The following discussions describe one or more embodiments for the match, expand, and filter technique for multi-view stereopsis in additional detail. Various specific values, formulas, and processes are discussed in the following. It is to be appreciated that these specific values, formulas, and processes are only examples, and that other values, formulas, and processes can alternatively be used.

Figure 3:
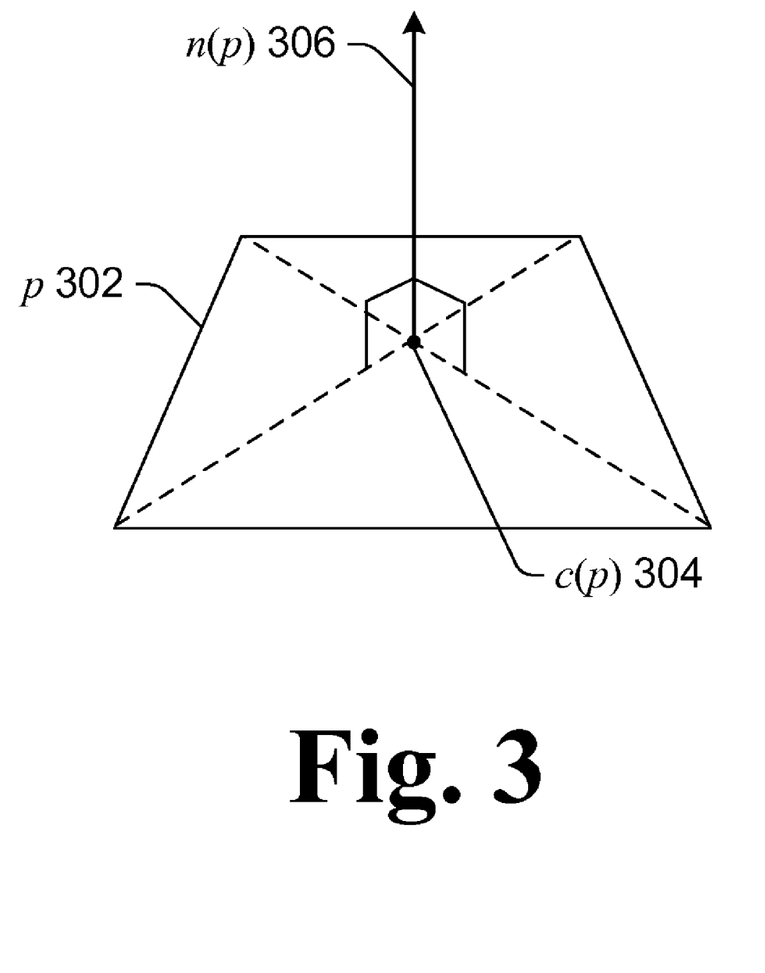
FIG. 3 illustrates an example of a patch in accordance with one or more embodiments.

In one or more embodiments, the match, expand, and filter technique for multi-view stereopsis uses a patch model in which a patch p is a local tangent plane approximation of a surface whose geometry is determined by its center c(p), unit normal vector n(p) oriented toward a camera (or other image capture device) observing it, and reference image R(p) in which p is visible. More specifically, a patch is a rectangle oriented so that one of its edges is parallel to the x-axis of the reference camera (the camera associated with R(p)). FIG. 3 illustrates an example of a patch in accordance with one or more embodiments. A patch p 302 is illustrated, having a center c(p) 304 and unit normal vector n(p) 306. The reference image R(p) is chosen so that the retinal plane of the image is close to parallel to p with little distortion (e.g., the smallest distortion of any of the multiple images of the object). The extent of the rectangle is determined so that the smallest axis-aligned square in R(p) containing its image projection becomes $\mu \times \mu$ pixels in size. In one or more embodiments, $\mu$ has a value of 5 or 7, although alternatively other values can be used.

Additionally, the match, expand, and filter technique for multi-view stereopsis also uses a photometric discrepancy function. Let V(p) denote a set of images in which patch p is visible. An example of the estimation of V(p) and setting the reference image $R(p) \in V(p)$ is discussed in more detail below. The photometric discrepancy function g(p) for patch p is defined as:

$$g(p) = \frac{1}{|V(p) \setminus R(p)|} \sum_{I \in V(p) \setminus R(p)} g(p, I, R(p)) \tag{1}$$

In formula (1), g(p,I,R(p)) is defined to be a pairwise photometric discrepancy function between images I and R(p). More specifically, given a pair of visible images $I_1$ and $I_2$, $g(p, I_1, I_2)$ is computed by first overlaying a $\mu \times \mu$ grid on patch p. Next, pixel colors $q(p, I_i)$ are sampled through bilinear interpolation at image projections of all the grid points in each image $I_i$. Next, a value of one minus the normalized cross correlation score between $q(p, I_1)$ and $q(p, I_2)$ is computed.

It should be noted that in the preceding discussions of the patch model and photometric discrepancy function, it has been assumed that the surface of an object or a scene is lambertian. However, the photometric discrepancy function g(p) may not work well in the presence of specular highlights or obstacles (e.g., pedestrians in front of buildings). In one or more embodiments, images with bad photometric discrepancy scores are ignored to handle non-lambertian effects. More specifically, only images whose pairwise photometric discrepancy score with the reference image R(p) is below a certain threshold $\alpha$ are used for the evaluation as follows:

$$V*(p) = \{I \mid I \in V(p), g(p, I, R(p)) \le \alpha\}, \quad (2)$$

$$g^*(p) = \frac{1}{|V^*(p)\setminus R(p)|} \sum_{I \in V^*(p)\setminus R(p)} g(p, I, R(p)) \quad (3)$$

In formula (2), the threshold a can have different values, as discussed in more detail below. Additionally, the value V(p) in formula (1) is replaced with the filtered one V*(p) to obtain formula (3). It should be noted that V*(p) includes the reference image R(p) by definition. It should also be noted that even the new discrepancy function g*(p) may not work if R(p) contains specular highlights or obstacles, but the patch generation process discussed below prevents such situations from occurring.

As part of a patch optimization process, having defined the photometric discrepancy function g*(p), patches whose associated discrepancy scores are small are recovered, where each patch p is individually reconstructed in the following two steps: first, initialization of the parameters, namely, its center c(p), normal n(p), visible images V*(p), and the reference image R(p); and second, optimization of its geometric component, c(p) and n(p). Example initialization methods are given in the discussion below. Focusing on the second optimization step, the geometric parameters, c(p) and n(p), are optimized by minimizing the photometric discrepancy score g*(p) with respect to these unknowns. In one or more embodiments, in order to simplify computations, c(p) is constrained to lie on a ray such that its image projection on the reference image does not change, reducing its number of degrees of freedom to one and solving only for a depth. In turn, n(p) is parameterized by Euler angles (yaw and pitch), and the total number of parameters for this optimization problem becomes three, which is solved by a conjugate gradient method (or any other optimization method).

Additionally, in one or more embodiments, a record of image projections of reconstructed patches in their visible images is maintained. Such a record can, for example, facilitate searching or accessing neighboring patches, enforcing regularization, and so forth. Such a record can be maintained, for example, by associating with each image $I_i$ a regular grid of $\beta_1 \times \beta_1$ pixels cells $C_i(x,y)$. In one or more embodiments $\beta_1$ has a value of 1 or 2, although alternatively other values can be used. Additionally, in one or more embodiments, the match, expand, and filter technique for multi-view stereopsis attempts to reconstruct at least one patch in every image cell $C_i(x,y)$. Given a patch p and its visible images V(p), patch p is projected onto each image in V(p) to identify the corresponding cell. Then, each cell $C_i(x,y)$ remembers a set of patches $Q_i(x,y)$ that project in itself. Similarly, a set of patches $Q_i^*(x,y)$ denotes patches that are obtained by the same procedure, but with V*(p) instead of V(p). These sets of patches $Q_i(x,y)$ and $Q_i(x,y)$ are used to reconstruct patches, as discussed in more detail below.

In one or more embodiments of the match, expand, and filter technique for multi-view stereopsis, feature matching is initially performed. This initial feature matching is performed, for example, in act 204 of FIG. 2, and can be performed, for example, by matching module 112 of FIG. 1. This initial feature matching can be viewed as two processes: a feature detection process and a feature matching process.

In one or more embodiments, the feature detection process is performed as follows. First, blob and corner features in each image are detected using a feature detector. In one or more embodiments, the feature detectors are the Difference-of-Gaussian (DoG) and Harris operators, although alternatively other feature detectors can be used. Using the Difference-of-Gaussian and Harris operators, a 2D Gaussian with standard deviation $\sigma$ is denoted by $G_\sigma$. The response of the Difference-of-Gaussian filter at some image point is given by $D=|(G_{\sigma_0}-G_{\sqrt{2}\sigma_0})*I|$, where * denotes the 2D convolution operator. The response of the Harris filter is, in turn, defined as $H=\det(M)-\lambda \mathrm{trace}^2(M)$, where $M=G_{\sigma_1}*(\nabla_I \nabla_I^T)$ and $$\nabla_I = \left[\frac{\partial I}{\partial x} \frac{\partial I}{\partial y}\right]^T.$$

The value $\nabla_I$ is computed by convolving the image I with the partial derivatives of the Gaussian $G_{\sigma_2}$. $(\nabla_I \nabla_I^T)$ is a 2×2 matrix, and $G_{\sigma_1}$ is convolved with each of its elements. In one or more embodiments $\sigma_0=\sigma_1=\sigma_2=1$ pixel and $\lambda=0.06$, although alternatively other values can be used for $\sigma_0, \sigma_1, \sigma_2$, and/or $\lambda$. To obtain uniform coverage, a coarse regular grid of $\beta_2 \times \beta_2$ pixels blocks is laid over each image, and as features the $\eta$ local maxima with the strongest responses in each block for each operator are returned. In one or more embodiments, $\beta_2=32$ and $\eta=4$, although alternatively other values can be used for $\beta_2$ and/or $\eta$.

Given the detected features, the feature matching process can be performed as follows. Consider an image $I_i$ and denote by $O(I_i)$ the optical center of the corresponding camera that capture the image $I_i$. For each feature f detected in $I_i$, from the other images is collected the set F of features f' of the same type (e.g., Harris or Difference-of-Gaussian) that lie within two pixels from the corresponding epipolar lines, and the 3D points associated with the pairs (f,f') are triangulated. These points are considered in order of increasing distance from $O(I_i)$ as potential patch centers, and generation of a patch from the points is attempted one by one until successful as discussed in the following. Alternatively, other heuristics for selecting matches can be performed.

Given a pair of features (f,f'), a patch candidate p is constructed with its center c(p), normal vector n(p) and reference image R(p) initialized as:

$$c(p) \leftarrow \{\text{Triangulation from } f \text{ and } f'\} \quad (4)$$

$$n(p) \leftarrow \overrightarrow{c(p)O(I_i)}/|\overrightarrow{c(p)O(I_i)}| \quad (5)$$

$$R(p) \leftarrow I_i \quad (6)$$

Reconstructed patches are typically sparse with possibly many false positives in the initial feature matching step. Accordingly, it can be assumed that the patch is visible in an image $I_i$ if the angle between the patch normal and the direction from the patch to the optical center $O(I_i)$ of the camera is below a certain threshold z as follows:

$$V(p) \leftarrow \{I | n(p) \cdot \overrightarrow{c(p)O(I)}/|\overrightarrow{c(p)O(I)}| > \cos(\iota)\} \quad (7)$$

In one or more embodiments $\iota=\pi/3$, although alternatively different values for $\iota$ can be used. Additionally, V*(p) is initialized from V(p) by formula (2) discussed above.

Having initialized the parameters for the patch candidate p, the values c(p) and n(p) are refined by the patch optimization process described above. Then, the visibility information V(p) and V*(p) are updated with the refined geometry. If there are at least a threshold number of images $\gamma$ with low photometric discrepancy (that is, if |V*(p)| is at least $\gamma$), then the patch generation is a success and patch p is stored in the corresponding cells of the visible images ($Q_i(x,y)$ and $Q_i^*(x,y)$ are updated). In one or more embodiments, the threshold value $\gamma$ is 2 or 3, although other values can alternatively be used.

It should be noted that formula (2) has been used to compute $V^*(p)$ before and after the patch optimization, although there is one threshold $\alpha$ in formula (2). The value $\alpha_0$ denotes the value of the threshold $\alpha$ used before the optimization, and a tighter threshold $\alpha_0 - 0.3$ is used after it due to the photometric discrepancy score of a patch possibly being high before the optimization. In one or more embodiments, $\alpha_0 = 0.6$, although alternatively other values can be used.

It should also be noted that once a patch has been reconstructed and stored in a cell, all the features in the cell can be removed and need not be used any more. This can create an increase in the speed of the computation of the feature matching process.

It should further be noted that this feature matching process is able to account for image artifacts such as specular highlights and obstacles, and does not use as reference images an image that contains such artifacts. If the feature matching process starts with a feature in an image containing an artifact, then the image becomes a reference temporarily and the patch optimization process fails. However, this does not prevent the procedure from starting with another image without artifacts, which will succeed.

Table I illustrates example pseudo code for the feature matching process discussed above. An input to the matching process is the features detected in each image, and an output of the matching process is a sparse set of patches P. In the pseudo code, comments or remarks are denoted beginning with "//".

Figure 4:
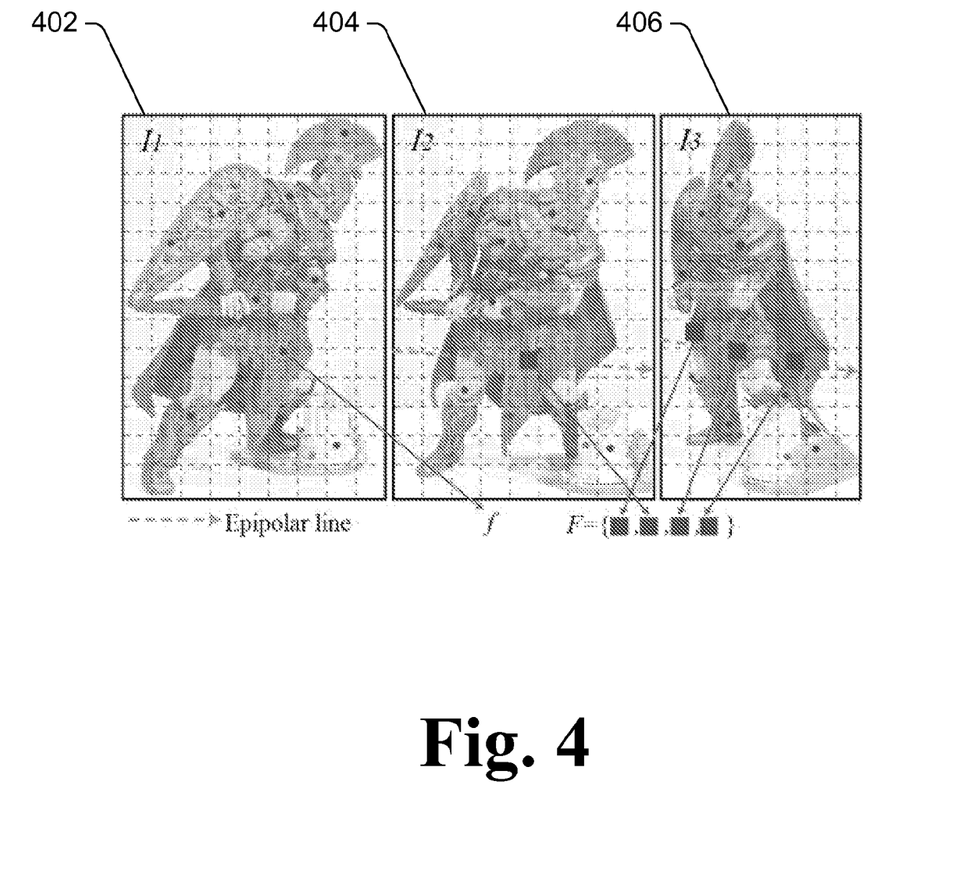
FIG. 4 illustrates an example of feature detection and matching across multiple images in accordance with one or more embodiments.

TABLE I $P \leftarrow \phi$;
For each image I with optical center O(I)
    For each feature f detected in I
        F ← {Features satisfying the epipolar consistency};
        Sort F in an increasing order of distance from O(I);
        For each feature f'∈F
            //Test a patch candidate p;
            Initialize c(p), n(p), and R(p); //Formulas (4), (5), and (6)
            Initialize V(p) and V*(p) with a threshold $\alpha_0$; //Formulas (2) and (7)
            Refine c(p) and n(p); //using the patch optimization process discussed above
            Update V(p) and V*(p) with a tighter threshold $\alpha_0 - 0.3$;
            If |V(p)| < γ
                Go back to the innermost For loop (failure);
            Add p to the corresponding $Q_i(x,y)$ and $Q_i^*(x,y)$;
            Remove features from the cells where p was stored;
            Add p to P;
            Exit innermost For loop;

FIG. 4 illustrates an example of feature detection and matching across multiple images in accordance with one or more embodiments. Three images are shown in FIG. 4: image $I_1$ 402, image $I_2$ 404, and image $I_3$ 406. The dashed lines in images 402, 404, and 406 also show the grids of cells in the images. Various features detected in the images 402, 404, and 406 using the Harris and/or Difference-of-Gaussian feature detectors are shown as dots in the images. Also shown is an example of features f'∈F satisfying the epipolar constraint in images 404 and 406 as they are matched to feature f in image 402.

After the initial feature matching is performed, the expansion process is performed. The expansion process can be performed, for example, in act 206 of FIG. 2, and can be performed, for example, by expansion module 114 of FIG. 1.

The goal of the expansion process is to reconstruct at least one patch in every image cell $C_i(x,y)$. This reconstruction process is repeated taking an existing patch and generating new ones in its neighboring empty spaces (neighboring empty cells for which no patch has been reconstructed). More specifically, given a patch p, a set of neighboring empty image cells C(p) is identified. A patch expansion procedure is then performed for each identified neighboring empty image cell. This expansion process is discussed in more detail in the following.

Cells are identified for expansion as follows. Given a patch p, C(p) is initialized by collecting the neighboring image cells in each visible image of the patch as follows:

$$C(p) = \{C_i(x',y') | p \in Q_i(x,y), |x-x'| + |y-y'| = 1\}$$

Next, image cells are removed from C(p) where the expansion procedure is unnecessary according to the following two criteria. First, if an image cell $C_i(x',y') \in C(p)$ contains a patch p' which is a neighbor of p, then there is no need to add a new patch there and $C_i(x',y')$ is removed from the set C(p), where a pair of patches p and p' are defined to be neighbors if:

$$|(c(p) - c(p')) \cdot n(p)| + |(c(p) - c(p')) \cdot n(p')| < 2\rho_1 \quad (8)$$

In formula (8), $\rho_1$ is computed as the distance corresponding to an image displacement of $\beta_1$ pixels in the reference image R(p) at the depth of the center of c(p) and c(p').

The second criteria is, even when an image cell $C_i(x',y') \in C(p)$ does not contain a neighbor of p, a patch should not be expanded if the corresponding surface region in 3D is not continuous from $C_i(x,y)$ to $C_i(x',y')$. For such image cells, the following condition is used to avoid the expansion step: If $Q_i^*(x,y)$ is not empty, that is, if $C_i(x,y)$ already contains a patch whose photometric discrepancy score associated with $I_i$ is better than the threshold $\alpha$ defined in formula (2), there is no need for the expansion and $C_i(x,y)$ is removed from C(p).

Figure 5:
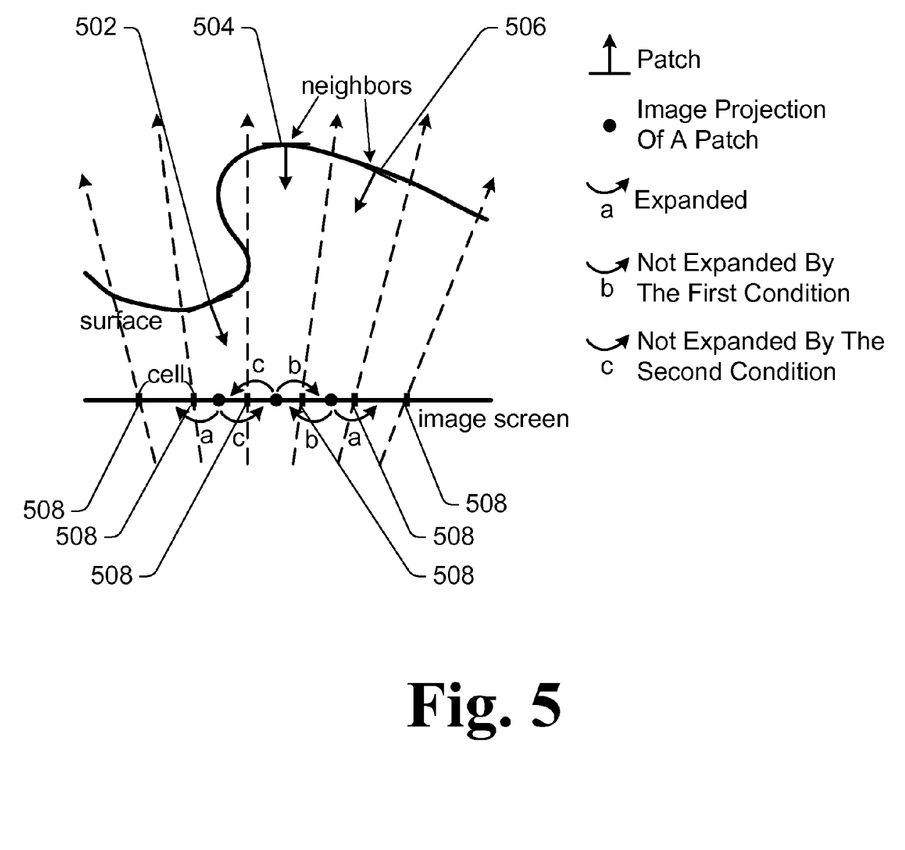
FIG. 5 illustrates an example of the identification of cells for expansion in accordance with one or more embodiments.

FIG. 5 illustrates an example of the identification of cells for expansion, as well as these two conditions, in accordance with one or more embodiments. In FIG. 5, multiple patches 502, 504, and 506 are illustrated. The image projection of the patch is shown as a dot on the image screen. Boundaries between cells 508 on the image are also shown. FIG. 5 illustrates that, given an existing patch, an expansion procedure is performed to generate new patches for the neighboring empty image cells in its visible images, shown as "a" in FIG. 5. The expansion procedure is not performed for an image cell if there already exists a neighbor in it (the first condition), shown as "b" in FIG. 5. Additionally, the expansion procedure is not performed for an image cell if the image cell already contains a patch whose photometric discrepancy score is better than the threshold in that image, shown as "c" in FIG. 5.

For each collected image cell $C_i(x,y) \in C(p)$, the following expansion procedure is performed to generate a new patch p'. More specifically, n(p'), R(p'), and V(p') are initialized by the corresponding values of p. c(p') is, in turn, initialized by the point where the viewing ray passing through the center of $C_i(x,y)$ intersects the plane containing the patch p. After computing V*(p') from V(p) by using formula (2) above with a threshold $\alpha_0$, refine c(p') and n(p') are refined by the patch optimization procedure discussed above.

After this patch optimization, a set of images in which the patch should be visible according to a depth-map testing is added to V(p'), where a depth value is computed for each image cell instead of a pixel. V*(p') is then updated with a tighter threshold $\alpha_0 - 0.3$ according to formula (2) above. Visible images obtained from the depth-map testing are added to V(p') instead of replacing the whole set because some matches (and thus the corresponding depth-map information) may be incorrect at this point. Given this updating, the visibility information associated with reconstructed patches can become inconsistent with each other, which is used in the filtering process to filter out erroneous patches as discussed in more detail below.

Continuing with the expansion procedure, if $|V^*(p')| \geq \gamma$ holds, then the patch is accepted as a success, and $Q_i(x,y)$ and $Q_i^*(x,y)$ are updated for its visible images. In one or more embodiments, the expansion procedure begins with $\alpha_0=0.6$ but loosens (increases) its value by 0.2 after each expansion/filtering iteration in order to accommodate challenging (e.g., homogeneous or relatively texture-less) regions in the later iterations.

In one or more embodiments, segmentation information for the images can be available. Such segmentation information can identify, for example, the portions of the images that are the foreground and the portions of the images that are the background. When such segmentation information is available, image cells in the background are ignored during the initial feature matching process and the expansion process, so no patches are reconstructed in the background.

Table II illustrates example pseudo code for the expansion process discussed above. On a first iteration, an input to the expansion process is the patches P from the matching process (e.g., the sparse set of patches P output by the matching process discussed above). On subsequent iterations, an input to the expansion process is the patches P from the filtering process. An output of the expansion process is an expanded set of reconstructed patches. In the pseudo code, comments or remarks are denoted beginning with "//".

TABLE II

While P is not empty
    Pick and remove a patch p from P;
    For each image cell $C_i(x,y)$ containing p
        Collect a set C of image cells for expansion;
        For each cell $C_i(x',y')$ in C
            // Create a new patch candidate p'
            $n(p') \leftarrow n(p)$, $R(p') \leftarrow R(p)$, $V(p') \leftarrow V^*(p')$;
            Update $V^*(p')$ with a threshold $\alpha_0$; //Formula (2)
            Refine c(p') and n(p'); // using the patch
            optimization process discussed above
            Add visible images (a depth-map testing) to V(p');
            Update $V^*(p')$ with a threshold $\alpha_0$-0.3; //Formula (2)
            If$|V^*(p')|<\gamma$
                Go back to For loop (failure);
            Add p' to P;
            Add p' to corresponding $Q_i(x,y)$ and $Q_i^*(x,y)$;

The filtering process is applied to the reconstructed patches resulting from the expansion process to remove erroneous patches. The filtering process employs three filters. In the first filter, inconsistency in visibility information is used. More specifically, a pair of patches p and p' is defined as being inconsistent in visibility information if p and p' are not neighbors (e.g., as defined by formula (8) above) but are stored in the same cell in one of the visible images. A further value U is defined to be a set of patches that is inconsistent in visibility information with patch p. Then, patch p is filtered out as an outlier if the following inequality holds:

$$|V^*(p)|(1 - g^*(p)) < \sum_{p_i \in U} 1 - g^*(p_i)$$

When p is an outlier, both $(1-g^*(p))$ and $|V^*(p)|$ are expected to be small, and p is likely to be removed.

Due to the rule to update visible images V(p) in the expansion process, the associated visibility information can become inconsistent with each other. Accordingly, the second filter also enforces the visibility consistency, but more strictly. With the second filter, for each patch p, the number of images in $V^*(p)$ where p is visible according to the depth-map testing is computed. If the number is less than $\gamma$, then p is filtered out as an outlier.

In the third filter, a weak form of regularization is enforced. For each patch p, the patches lying in its own and adjacent cells in all images of V(p) are collected. If the proportion of patches that are neighbors (as defined using formula (8) above) of p in this set is lower than a threshold amount (e.g., 0.25, although alternatively other values can be used), then p is removed as an outlier.

Figure 6:
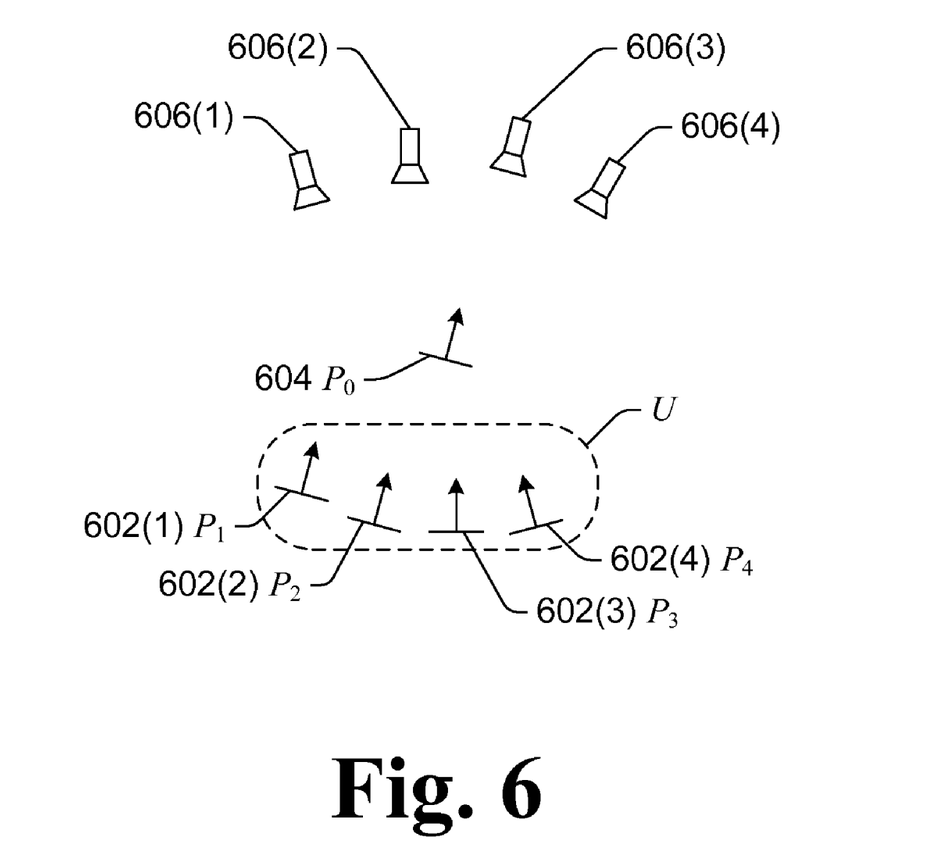
FIG. 6 illustrates an example of an outlier patch in accordance with one or more embodiments.

FIG. 6 illustrates an example of an outlier patch in accordance with one or more embodiments. In the example of FIG. 6, the patch lies outside the real surface. In FIG. 6, a set U includes four patches $P_1$ 602(1), $P_2$ 602(2), $P_3$ 602(3), and $P_4$ 602(4) that are occluded by an outlier patch $P_0$ 604. Four capture devices 606(1), 606(2), 606(3), and 606(4) are also illustrated that represent images I in V(p) that have been captured for the object.

Figure 7:
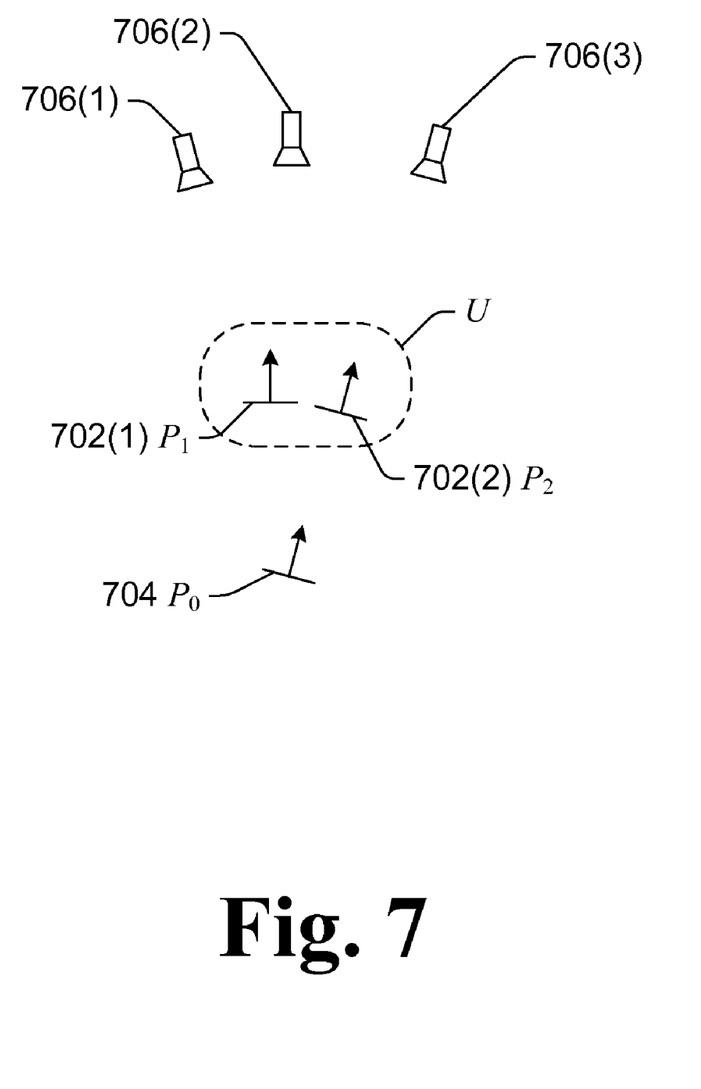
FIG. 7 illustrates another example of an outlier patch in accordance with one or more embodiments.

The second filter focuses on outliers lying inside the actual surface of the object. FIG. 7 illustrates another example of an outlier patch in accordance with one or more embodiments. In the example of FIG. 7, the patch lies inside the actual surface of the object. In FIG. 7, a set U includes two patches $P_1$ 702(1) and $P_2$ 702(2). An outlier patch $P_0$ 704 is inside the actual surface of the object. Three capture devices 706(1), 706(2), and 706(3) are also illustrated that represent images I in V(p) that have been captured for the object.

After iterating through the expansion and filtering processes multiple times, the resultant reconstructed patches form a 3D model in the form of an oriented point or surfel model. This oriented point or surfel model can be output to various other components or modules, or can alternatively be converted into different models.

In one or more embodiments, the reconstructed patches are converted into surface meshes that can be used, for example, in image-based modeling modules or components. This conversion process initializes a polygonal mesh model from the reconstructed patches, then performs a final surface refinement.

Different techniques can be used to initialize the polygonal mesh model from the reconstructed patches. In one or more embodiments, the mesh initialization process is performed using a *Poisson Surface Reconstruction* (PSR) technique that directly converts a set of oriented points into a triangulated mesh model. An example of such a technique is discussed in "Poisson Surface Reconstruction" by M. Kazhdan et al. in *Symp. Geom. Proc.* (2006). The resolution of the mesh model is adaptive and the size of a triangle depends on the density of the nearby oriented points: the denser the points are, the finer the triangles become. PSR techniques output a closed mesh model even when patches are reconstructed for a part of a scene. In order to remove extraneous portions of a mesh model generated using such PSR techniques, triangles whose average edge length is greater than a threshold factor (e.g., six times, although alternatively other factors can be used) the average edge length of the whole mesh are removed, since triangles are large where there are no patches.

In one or more other embodiments, rather than using PSR techniques, a visual hull model is computed from foreground/background segmentation information associated with each image that is available for the object. The visual hull model is iteratively deformed towards reconstructed patches. More specifically, a set of 3D coordinates of the vertices in a mesh model are optimized by the gradient decent method while minimizing the sum of two per-vertex energy functions. The first energy function $E_s(v_i)$ measures a geometric smoothness energy and is defined as follows:

$$E_s(v_i) = |-\zeta_1 \Delta v_i + \zeta_2 \Delta^2 v_i|^2 / \tau^2 \qquad (9)$$

where $\Delta$ denotes the (discrete) Laplacian operator relative to a local parameterization of the tangent plane in $v_i$, $\tau$ is the average edge length of the mesh model, and $v_i$ denotes the position of a vertex $v_i$. In one or more embodiments, $\zeta_1 = 0.6$ and $\zeta_2 = 0.4$, although alternatively other values for $\zeta_1$ and/or $\zeta_2$ can be used.

The second energy function $E_p(v_i)$ enforces the photometric consistency with the reconstructed patches and is defined as follows:

$$E_p(v_i) = \max\left(-0.2, \min\left(0.2, \frac{d(v_i) \cdot n(v_i)}{\tau}\right)\right) \qquad (10)$$

where $n(v_i)$ is the inward unit normal of the surface at $v_i$. The value $d(v_i)$ is the signed distance between $v_i$ and the reconstructed patches along $n(v_i)$, which is estimated as follows. For each patch p whose normal $n(p)$ is compatible with that of $v_i$ (that is, $n(p) \cdot n(v_i) > 0$), a distance between the center $c(p)$ of the patch p and the line defined by $v_i$ and $n(v_i)$ is computed. The set $\pi(v_i)$ of $\pi = 10$ closest patches is then collected, although other values for $\pi$ can alternatively be used.

Figure 8:
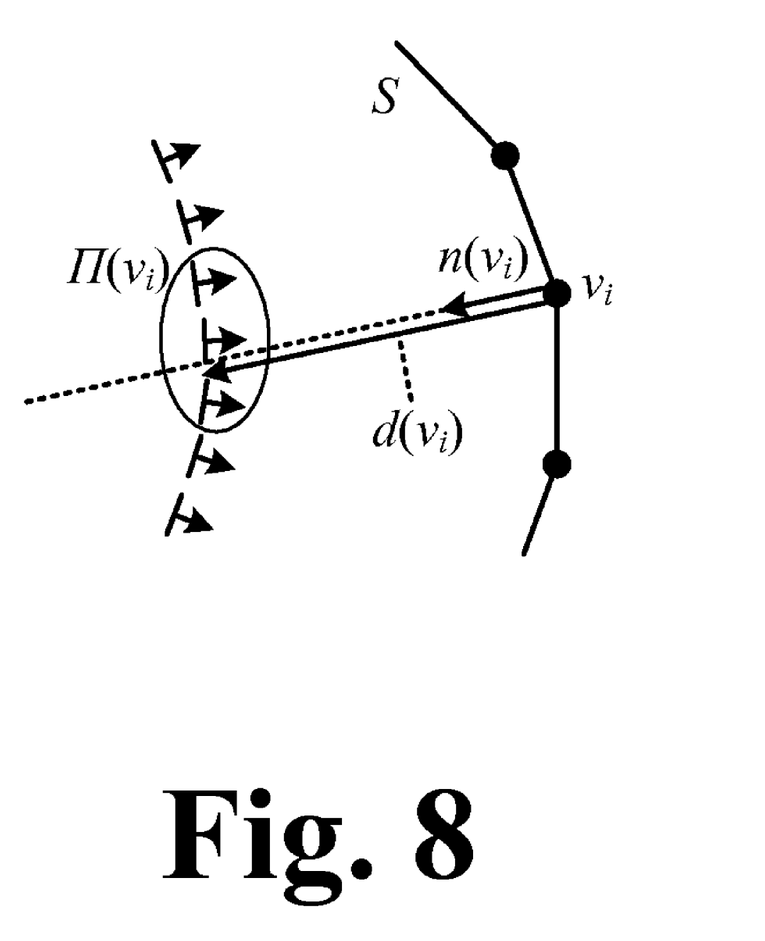
FIG. 8 illustrates an example of a collection of patches in accordance with one or more embodiments.

FIG. 8 illustrates an example of this collection of patches in accordance with one or more embodiments. For each vertex $v_i$ on the mesh model, $\pi$ (e.g., which equals 10) patches $\Pi(v_i)$ that are closest to the line defined by $v_i$ and a surface normal $n(v_i)$ at the vertex are collected. A (signed) distance $d(v_i)$ from $v_i$ to $\Pi(v_i)$ is used to compute the photometric discrepancy term.

Then, $d(v_i)$ is computed as the weighted average distance from $v_i$ to the centers of the patches in $\Pi(v_i)$ along $n(v_i)$ as follows:

$$d(v_i) = \sum_{p \in \Pi(v_i)} w(p)[n(v_i) \cdot (c(p) - v_i)] \qquad (11)$$

where the weights $w(p)$ are Gaussian functions of the distance between $c(p)$ and the line defined by $v_i$ and $n(v_i)$, with standard deviation $\rho_1$ defined as above with reference to the identification of cells for expansion during the expansion process, and normalized to sum to one.

These formulas (9), (10), and (11) are iterated until convergence, while applying remeshing operations to avoid self-intersections once every threshold number of gradient descent steps so that the edge lengths of the triangles on a mesh become approximately the same. In one or more embodiments, this threshold number of gradient descent steps is five, although alternatively larger or smaller threshold numbers can be used. The remeshing operations include, for example, edge split, contract, and swap as discussed in "Mesh Optimization" by H. Hoppe et al. in SIGGRAPH '93 (1993). After convergence, the resolution of the mesh is increased, and the process of iterating formulas (9), (10), and (11) is repeated until the desired resolution is obtained. In one or more embodiments, this process is repeated until image projections of edges of the mesh become approximately $\beta_1$ pixels in length.

The final surface refinement, also referred to as the final mesh refinement, is performed via an energy minimization approach as in the iterative process discussed above regarding the initialization of a polygonal mesh model from the reconstructed patches. A set of 3D coordinates of the vertices are optimized with respect to a sum of per-vertex photometric discrepancy and geometric smoothness energy functions. The smoothness function is formula (9) discussed above. The photometric discrepancy energy is also similar and computed from a set of patches as in formula (10) discussed above, although the idea of occlusion robust photo-consistency discussed in "Multiview Stereo via Volumetric Graph-Cuts and Occlusion Robust Photoconsistency" by G. Vogiatzis, et al. in IEEE Trns. Pattern Anal. Mach. Intell. (2007) is used, with two changes.

The first change in the occlusion robust photo-consistency function is that all the patches reconstructed in the expansion process discussed above are discarded, and new patches are re-computed for each vertex independently from each pair of visible images in order to handle "bad" images. More specifically, let $V(v_i)$ denote a set of images in which $v_i$ is visible that is estimated from a standard depth-map testing with a current mesh model. For each pair $(I_j, I_k)$ of images in $V(v_i)$, a patch p is created on the tangent plane of the mesh at $v_i$, namely setting $c(p) \leftarrow c(v_i)$ and $n(p) \leftarrow n(v_i)$, then the photometric discrepancy function $g(p, I_j, I_k)$ with respect to $c(p)$ and $n(p)$ is minimized as discussed above regarding the patch optimization. Having obtained a set of patches $P(v_i)$ after the patch optimization for pairs of images, a scheme to combine information to handle "bad" patches is changed, where the photometric discrepancy energy is defined as $$E'_p(v_i) = \zeta_3 \sum_{p \in P(v_i)} 1 - \exp\left(-\left(\frac{d'(v_i, p)}{\tau/4}\right)^2\right), \qquad (12)$$

$$d'(v_i, p) = n(p) \cdot (c(p) - v_i)$$

where $d'(v_i, p)$ is the (signed) distance between the patch p and the vertex $v_i$ along the patch normal, $\tau$ is the average edge length of the mesh, and $\zeta_3$ is the linear combination weight. It should be noted that the patches $P(v_i)$ are computed once at the beginning as pre-processing for each vertex, while the photometric discrepancy energy in formula (12) is evaluated many times in the energy minimization procedure performed by a conjugate gradient method.

The idea of occlusion robust photo-consistency discussed in "Multiview Stereo via Volumetric Graph-Cuts and Occlusion Robust Photoconsistency" is modified in a couple different manners. First, in addition to a depth value, a surface normal is incorporated in the framework discussed herein, both in the patch optimization process discussed above and in formula (12). Second, a Gaussian (kernel) function is used to combine multiple hypothesis (patches) in a fully continuous domain (in formula (12)), whereas a box function with discretized voxels is chosen in "Multiview Stereo via Volumetric Graph-Cuts and Occlusion Robust Photoconsistency", which ends up simply casting votes to voxels.

Figure 9:
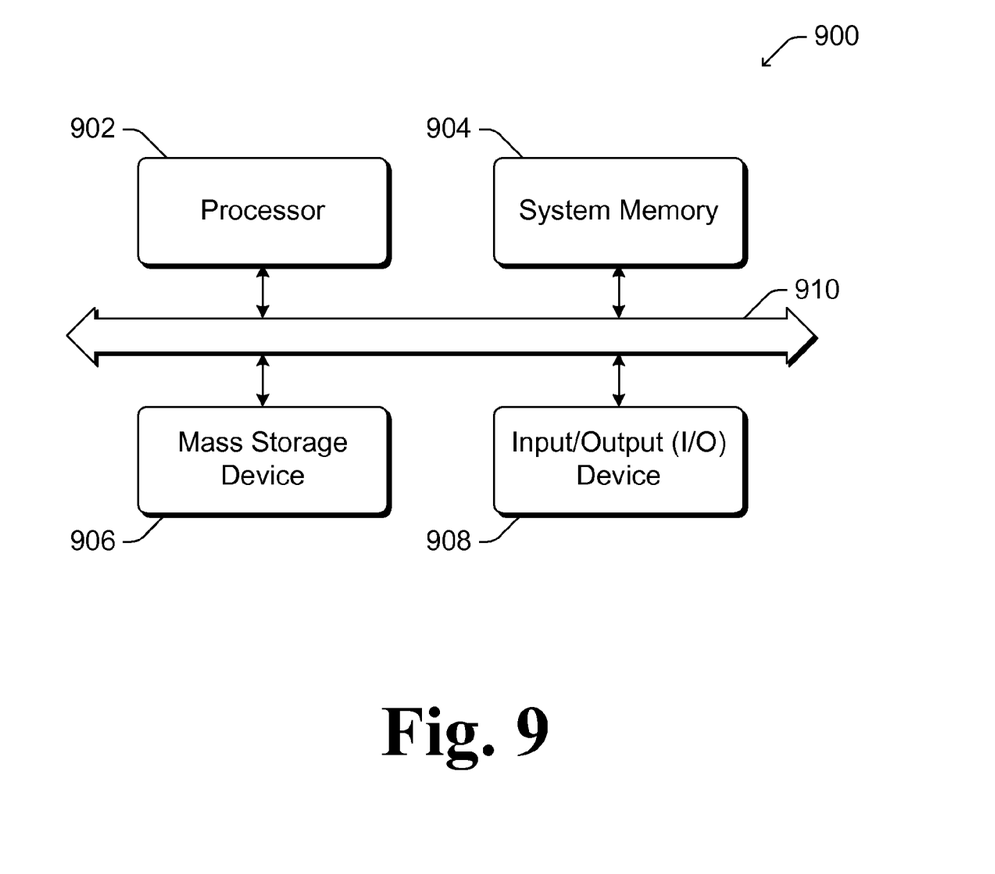
FIG. 9 is a block diagram illustrating an example computing device that can be used to implement the various techniques and processes discussed herein in accordance with one or more embodiments.

FIG. 9 is a block diagram illustrating an example computing device 900 that can be used to implement the various techniques and processes discussed herein in accordance with one or more embodiments. Computing device 900 can be any of a wide variety of computing devices, such as a desktop computer, a laptop computer, a portable or handheld computer, a server computer, an automotive computer, a personal digital assistant (PDA), an Internet appliance, a cellular or other wireless phone, a set-top box, a game console, a portable music player, a digital or video camera, audio and/or video players, audio and/or video recorders, and so forth Computing device 900 includes one or more processors 902, one or more system memories 904, one or more mass storage devices 906, and one or more input/output (I/O) device(s) 908, and one or more buses 910. Processor 902 includes one or more processors or controllers that execute instructions stored in system memory 904 and/or mass storage device 906. Each processor 902 can include one or more processing cores. Processor 902 can also include computer readable media, such as cache memory.

System memory 904 includes various computer readable media, including volatile memory (such as random access memory (RAM)) and/or nonvolatile memory (such as read only memory (ROM)). System memory 904 can also include rewritable ROM, such as Flash memory.

Mass storage device 906 includes various computer readable media, such as magnetic disks, optical disks, solid state memory (e.g., flash memory), and so forth. Various drives can also be included as a mass storage device 906 to enable reading from and/or writing to the various computer readable media. Mass storage device 906 includes removable media and/or nonremovable media.

I/O device 908 includes various devices that allow data and/or other information to be input to and/or output from computing device 900. Examples of I/O devices 908 include cursor control devices, keypads, microphones, monitors or other displays, speakers, printers, network interface cards, modems, lenses, CCDs or other image capture devices, and so forth.

Bus 910 allows processor 902, system 904, mass storage device 906, and I/O device 908 to communicate with one another. Bus 910 can be one or more of multiple types of buses, such as a system bus, PCI bus, IEEE 1394 bus, USB bus, wireless USB bus, and so forth.

The techniques discussed herein can be implemented in software, firmware, hardware, and/or combinations thereof. For example, the various modules discussed herein can each be implemented as one or more software components or modules, one or more firmware components or modules, and/or one or more hardware components or modules. The software components or modules typically include instructions to be executed, or that can be converted into an executable form, to be executed by one or more processors 902. The hardware components or modules can be implemented as one or more application-specific integrated circuits (ASICs), one or more programmable logic devices (PLDs), and so forth.

Although the description above uses language that is specific to structural features and/or methodological acts in processes, it is to be understood that the subject matter defined in the appended claims is not limited to the specific features or processes described. Rather, the specific features and processes are disclosed as example forms of implementing the claims. Various modifications, changes, and variations apparent to those skilled in the art may be made in the arrangement, operation, and details of the disclosed embodiments herein.

What is claimed is:

1. A method comprising:
    matching features across multiple images of an object to obtain a sparse set of patches for the object;
    expanding the sparse set of patches to obtain a dense set of patches for the object, the expanding comprising:
        creating a patch candidate;
        determining, for the patch candidate, whether there are at least a threshold number of images of the multiple images having pairwise photometric discrepancy scores with a reference image of the multiple images that are less than a threshold value; and
        including the patch candidate in the dense set of patches only if there are at least the threshold number of images of the multiple images having pairwise photometric discrepancy scores with the reference image of the multiple images less than the threshold value;
    filtering the dense set of patches to remove false matches; and
    repeating the expanding and filtering one or more times, each time expanding the dense set of patches obtained by the previously performed filtering.

2. A method as recited in claim 1, the filtering comprising filtering the dense set of patches to remove false matches based on visibility information.

3. A method as recited in claim 1, the one or more times comprising multiple times.

4. A method as recited in claim 1, further comprising outputting the filtered dense set of patches as a 3-dimensional model of the object.

5. A method as recited in claim 1, further comprising generating, based on the filtered dense set of patches after repeating the expanding and the filtering one or more times, a set of surface meshes for the object.

6. A method as recited in claim 1, each patch being defined by a center $c(p)$, a unit normal vector $n(p)$ oriented toward a camera observing the patch, and a reference image $R(p)$ in which the patch is visible.

7. A method as recited in claim 1, further comprising:
    overlaying a grid of cells on each of the multiple images;
    associating with each cell a set of patches that project in the cell; and
    wherein expanding the sparse set of patches comprises expanding the sparse set of patches based at least in part on the sets of patches that project in the cells.

8. A method as recited in claim 1, further comprising:
    overlaying a grid of multiple cells on each of the multiple images; and
    wherein the expanding comprises expanding the sparse set of patches to obtain the dense set of patches in which one or more patches are reconstructed for each of the multiple cells.

9. A method as recited in claim 1, further comprising:
    overlaying a grid of multiple cells on each of the multiple images; and
    wherein the expanding comprises expanding the sparse set of patches by generating, for a patch in the sparse set of patches that projects in a cell, a new patch in each empty cell neighboring the cell.

10. A method as recited in claim 1, the filtering comprising removing one or more patches that lie outside a surface of the object, and removing one or more patches that lie inside the surface of the object.

11. One or more computer readable media devices having stored thereon multiple instructions that, when executed by one or more processors, cause the one or more processors to:
    match features in multiple images of an object to obtain a sparse set of patches for the object;
    expand the sparse set of patches to include additional patches, resulting in a dense set of patches for the object, wherein to expand the sparse set of patches is to:
    create a patch candidate;
    determine, for the patch candidate, whether there are at least a threshold number of images of the multiple images having pairwise photometric discrepancy scores with a reference image of the multiple images that are less than a threshold value; and
    include the patch candidate in the dense set of patches only if there are at least the threshold number of images of the multiple images having pairwise photometric discrepancy scores with the reference image of the multiple images less than the threshold value;
filter the dense set of patches to remove erroneous patches; and
perform one or more iterations of the expanding and filtering, each iteration expanding the dense set of patches obtained by the previously performed filtering.

12. One or more computer readable media devices as recited in claim 11, wherein to filter the dense set of patches is to remove erroneous patches based on visibility information.

13. One or more computer readable media devices as recited in claim 11, the one or more iterations comprising multiple iterations.

14. One or more computer readable media devices as recited in claim 11, the instructions further causing the one or more processors to output the filtered dense set of patches as a 3-dimensional model of the object.

15. One or more computer readable media devices as recited in claim 11, the instructions further causing the one or more processors to generate, based on the filtered dense set of patches after performing the one or more iterations of the expanding and filtering, a set of surface meshes for the object.

16. One or more computer readable media devices as recited in claim 11, the instructions further causing the one or more processors to:
overlay a grid of multiple cells on each of the multiple images; and
wherein to expand the sparse set of patches is to expand the sparse set of patches by generating, for a patch in the sparse set of patches that projects in a cell, a new patch in each empty cell neighboring the cell.

17. One or more computer readable media devices as recited in claim 11, wherein to filter the dense set of patches is to remove one or more patches that lie outside a surface of the object, and remove one or more patches that lie inside the surface of the object.

18. A device comprising:
a matching module to match features across multiple images of an object in order to obtain a sparse set of patches for the object;
an expansion module to:
expand, on a first of multiple iterations, the sparse set of patches to obtain a dense set of patches for the object, wherein to expand the sparse set of patches is to:
create a patch candidate,
determine, for the patch candidate, whether there are at least a threshold number of images of the multiple images having pairwise photometric discrepancy scores with a reference image of the multiple images that are less than a threshold value, and
include the patch candidate in the dense set of patches only if there are at least the threshold number of images of the multiple images having pairwise photometric discrepancy scores with the reference image of the multiple images less than the threshold value; and
expand, on subsequent iterations of the multiple iterations, a filtered dense set of patches obtained from filtering a previous dense set of patches for the object; and
a filtering module to filter, on each of the multiple iterations, the dense set of patches to remove false matches prior to expansion of the dense set of patches in the subsequent iteration of the multiple iterations.

19. A device as recited in claim 18, wherein the filtering module is to filter the dense set of patches to remove erroneous patches based on visibility information.

20. A device as recited in claim 18, wherein the device is to generate a 3-dimensional model of the object.

21. A device as recited in claim 18, wherein the device is to generate, based on the filtered dense set of patches after expanding and filtering in the multiple iterations, a set of surface meshes for the object.

22. A device as recited in claim 18, wherein the filtering module is to filter the dense set of patches to remove one or more patches that lie outside a surface of the object, and remove one or more patches that lie inside the surface of the object.

23. A method as recited in claim 1, the expanding including using segmentation information to identify portions of the multiple images that are background, and ignoring during the expanding cells included in portions of the multiple images that are background, the cells being included in a grid of cells overlaying each of the multiple images.

24. A method as recited in claim 1, the expanding further comprising increasing the threshold value each time the expanding and filtering is repeated.

25. A method as recited in claim 1, the filtering comprising, for each of one or more particular patches in the dense set of patches:
identifying a set of patches that is inconsistent in visibility information with the particular patch, an additional patch being inconsistent in visibility information with the particular patch if the additional patch and the particular patch are not neighbors but are stored in a same cell in one of the multiple images; and
where p represents the particular patch, V*(p) represents ones of the multiple images having pairwise photometric discrepancy scores with a reference image of the multiple images that are less than a threshold value, g*(p) represents the photometric discrepancy for the particular patch, U represents the set of patches that is inconsistent in visibility information with the particular patch, removing the patch from the dense set of patches if the following inequality holds:

$$|V^*(p)|(1 - g^*(p)) < \sum_{p_i \in U} 1 - g^*(p_i).$$

26. A method as recited in claim 1, the filtering comprising, for each of one or more patches in the dense set of patches:
determining, for a set of images of the multiple images having pairwise photometric discrepancy scores with a reference image of the multiple images that are less than a threshold value, whether there are at least a threshold number of images in the set of images where the patch is visible; and
removing the patch from the dense set of patches if there are not at least the threshold number of images in the set of images where the patch is visible.

27. A method as recited in claim 1, the filtering comprising, for each of one or more patches in the dense set of patches:
identifying, from ones of the multiple images in which the patch is visible, a set of patches that includes patches lying in a cell of the patch as well as in cells adjacent to the cell of the patch; and
removing the patch from the dense set of patches if a proportion of patches in the set of patches that are neighbors is less than a threshold amount.

28. A method as recited in claim 27, in which p represents a first patch in the set of patches, c(p) represents the center of the first patch, n(p) represents a unit normal vector of the first patch, p' represents a second patch in the set of patches, c(p) represents the center of the first patch, c(p') represents the center of the second patch, n(p') represents a unit normal vector of the second patch, $\rho_1$ represents a threshold value, and further comprising determining that the first patch and the second patch are neighbors if:

$$|(c(p)-c(p'))\cdot n(p)|+|(c(p)-c(p'))\cdot n(p')|<2\rho_1.$$

29. One or more computer readable media devices as recited in claim 11, wherein to expand the sparse set of patches is further to increase the threshold value in each of the one or more iterations.

30. One or more computer readable media devices as recited in claim 11, wherein to filter the dense set of patches is to, for each of one or more particular patches in the dense set of patches:
  identify a set of patches that is inconsistent in visibility information with the particular patch, an additional patch being inconsistent in visibility information with the particular patch if the additional patch and the particular patch are not neighbors but are stored in a same cell in one of the multiple images; and
  where p represents the particular patch, V*(p) represents ones of the multiple images having pairwise photometric discrepancy scores with a reference image of the multiple images that are less than a threshold value, g*(p) represents the photometric discrepancy for the particular patch, U represents the set of patches that is inconsistent in visibility information with the particular patch, remove the patch from the dense set of patches if the following inequality holds:

$$|V^*(p)|(1-g^*(p)) < \sum_{p_i \in U} 1-g^*(p_i).$$

31. One or more computer readable media devices as recited in claim 11, wherein to filter the dense set of patches is to, for each of one or more patches in the dense set of patches:
  identify, from ones of the multiple images in which the patch is visible, a set of patches that includes patches lying in a cell of the patch as well as in cells adjacent to the cell of the patch;
  remove the patch from the dense set of patches if a proportion of patches in the set of patches that are neighbors is less than a threshold amount; and
  where p represents a first patch in the set of patches, c(p) represents the center of the first patch, n(p) represents a unit normal vector of the first patch, p' represents a second patch in the set of patches, c(p) represents the center of the first patch, c(p') represents the center of the second patch, n(p') represents a unit normal vector of the second patch, $\rho_1$ represents a threshold value, and determine that the first patch and the second patch are neighbors if:

$$(|c(p)-c(p'))\cdot n(p)|+|c(p)-c(p'))\cdot n(p')|<2\rho_1.$$

32. A device as recited in claim 18, wherein to expand the sparse set of patches is further to increase the threshold value for each of the subsequent iterations of the multiple iterations.

33. A device as recited in claim 18, wherein to filter the dense set of patches is to, for each of one or more particular patches in the dense set of patches:
  identify a set of patches that is inconsistent in visibility information with the particular patch, an additional patch being inconsistent in visibility information with the particular patch if the additional patch and the particular patch are not neighbors but are stored in a same cell in one of the multiple images; and
  where p represents the particular patch, V*(p) represents ones of the multiple images having pairwise photometric discrepancy scores with a reference image of the multiple images that are less than a threshold value, g*(p) represents the photometric discrepancy for the particular patch, U represents the set of patches that is inconsistent in visibility information with the particular patch, remove the patch from the dense set of patches if the following inequality holds:

$$|V^*(p)|(1-g^*(p)) < \sum_{p_i \in U} 1-g^*(p_i).$$

34. A device as recited in claim 18, wherein to filter the dense set of patches is to, for each of one or more patches in the dense set of patches:
  identify, from ones of the multiple images in which the patch is visible, a set of patches that includes patches lying in a cell of the patch as well as in cells adjacent to the cell of the patch;
  remove the patch from the dense set of patches if a proportion of patches in the set of patches that are neighbors is less than a threshold amount; and
  where p represents a first patch in the set of patches, c(p) represents the center of the first patch, n(p) represents a unit normal vector of the first patch, p' represents a second patch in the set of patches, c(p) represents the center of the first patch, c(p') represents the center of the second patch, n(p') represents a unit normal vector of the second patch, $\rho_1$ represents a threshold value, and determine that the first patch and the second patch are neighbors if:

$$|(c(p)-c(p'))\cdot n(p)|+|(c(p)-c(p'))\cdot n(p')|<2\rho_1.$$

* * * * *